United States Patent
Topchy et al.

(10) Patent No.: US 9,661,402 B2
(45) Date of Patent: May 23, 2017

(54) EMBEDDING INFORMATION IN GENERATED ACOUSTIC SIGNALS

(71) Applicant: The Nielsen Company (US), LLC, Schaumburg, IL (US)

(72) Inventors: Alexander Topchy, New Port Richey, FL (US); Padmanabhan Soundararajan, Tampa, FL (US); Venugopal Srinivasan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 131 days.

(21) Appl. No.: 14/332,037

(22) Filed: Jul. 15, 2014

(65) Prior Publication Data
US 2016/0021435 A1 Jan. 21, 2016

(51) Int. Cl.
| G08C 19/00 | (2006.01) |
| G08C 19/38 | (2006.01) |
| H04Q 9/00 | (2006.01) |
| G08C 23/02 | (2006.01) |

(52) U.S. Cl.
CPC ............. *H04Q 9/00* (2013.01); *G08C 23/02* (2013.01); *H04Q 2209/823* (2013.01)

(58) Field of Classification Search
CPC .. H04Q 9/14; H04Q 9/02; H04Q 9/00; H04Q 2209/823; G08C 23/02; Y02T 10/7005
See application file for complete search history.

(56) References Cited

U.S. PATENT DOCUMENTS

| 3,777,180 A | 12/1973 | Carlson |
| 4,280,204 A | 7/1981 | Elchinger |
| 4,506,353 A | 3/1985 | Rott et al. |
| 4,680,739 A | 7/1987 | Lannuzel |
| 4,797,673 A | 1/1989 | Dombrowski |
| 5,635,903 A | 6/1997 | Koike et al. |
| 5,798,458 A | 8/1998 | Monroe |
| 5,973,618 A | 10/1999 | Ellis |

(Continued)

FOREIGN PATENT DOCUMENTS

| JP | 2002168685 | 6/2002 |
| WO | 2016010575 | 1/2016 |

OTHER PUBLICATIONS

Christopher Shea and Stephen Mihm, "The 9th Annual year in Ideas", The New York Times, dated May 29, 2014 (2 pages).

(Continued)

*Primary Examiner* — Erin File
(74) *Attorney, Agent, or Firm* — Hanley, Flight & Zimmerman, LLC

(57) ABSTRACT

Methods, apparatus, systems and articles of manufacture (e.g., physical storage media) to embed information in generated acoustic signals are disclosed. Example methods disclosed herein to embed information in an acoustic signal output from an electric vehicle include obtaining a first audio signal to be used to generate the acoustic signal. Such example also include combining a second signal with the first audio signal, the second signal to convey first digital information that, when detected, indicates a presence of the electric vehicle. Such example methods further include providing the first audio signal with the second signal to an audio circuit that is to output the acoustic signal from the electric vehicle.

23 Claims, 6 Drawing Sheets

(56) References Cited

U.S. PATENT DOCUMENTS

| | | | |
|---|---|---|---|
| 6,845,360 | B2 | 1/2005 | Jensen et al. |
| 7,253,746 | B2 | 8/2007 | Maekawa et al. |
| 7,267,281 | B2 | 9/2007 | Hopkins |
| 7,650,001 | B2 | 1/2010 | Yasushi et al. |
| 8,125,348 | B2 | 2/2012 | Cemper |
| 8,138,897 | B2 | 3/2012 | Leyerle |
| 8,179,234 | B1 | 5/2012 | Atwood |
| 8,204,243 | B2 | 6/2012 | Smith |
| 8,212,656 | B2 | 7/2012 | Nakayama et al. |
| 8,451,143 | B2 | 5/2013 | Nakayama |
| 8,669,858 | B2 | 3/2014 | Yoshino et al. |
| 8,693,285 | B2 | 4/2014 | Watanabe et al. |
| 8,730,027 | B2 | 5/2014 | Saito et al. |
| 8,731,767 | B2 | 5/2014 | Paturle |
| 8,972,246 | B2 | 3/2015 | Park et al. |
| 2003/0118210 | A1 | 6/2003 | Patterson et al. |
| 2005/0080533 | A1* | 4/2005 | Basir ............... B60N 2/002 701/45 |
| 2007/0229235 | A1 | 10/2007 | Hirai |
| 2007/0285218 | A1* | 12/2007 | Fletcher ............ B60N 2/002 340/457 |
| 2008/0027734 | A1 | 1/2008 | Zhao et al. |
| 2010/0223062 | A1 | 9/2010 | Srinivasan et al. |
| 2010/0245581 | A1* | 9/2010 | Koyama ............ G08G 1/0965 348/149 |
| 2010/0289663 | A1 | 11/2010 | Savchenko |
| 2011/0144844 | A1* | 6/2011 | Ishibashi ........... B60L 11/1846 701/22 |
| 2012/0092965 | A1 | 4/2012 | Zhou et al. |
| 2012/0166042 | A1 | 6/2012 | Kokido et al. |
| 2012/0274459 | A1* | 11/2012 | Jaisimha ........... H04H 20/31 340/438 |
| 2012/0316734 | A1 | 12/2012 | Takagi |
| 2013/0127638 | A1 | 5/2013 | Harrison |
| 2013/0151063 | A1 | 6/2013 | Baughman et al. |
| 2014/0055258 | A1 | 2/2014 | Grosse-Budde |
| 2014/0258457 | A1* | 9/2014 | Han .................. H04L 61/2007 709/217 |
| 2015/0061850 | A1* | 3/2015 | Omote ............... B60Q 5/008 340/425.5 |
| 2015/0264500 | A1* | 9/2015 | Aoyagi .............. B60Q 5/008 381/56 |

OTHER PUBLICATIONS

Jim Motavalli, "Blind Advocates 'Disappointed' in Nissan E.V. Sounds for Pedestrians", The New York Times, dated Jun. 17, 2010 (6 pages).

Jim Motavalli, "Could Electric Cars Sound like 'Blade Runner'?"; The New York Times, dated Oct. 15, 2009 (6 pages).

Wikipedia, "Electric vehicle warning sounds", <http://en.wikipedia.org/w/index.php?title=Electric_vehicle_warning_sounds&oldid=606581921>, May 1, 2014 (16 pages).

Thomas Gadegaard, "Electric Cars Need Artificial Engine Sounds", ECTunes <http://ectunes.com/c/news/electric-cars-need-artificial-engine-sounds.com>, dated Jan. 4, 2011 (2 pages).

Continental Engineering Services, "Sound Generator for Electric Vehicles", Continental Engineering Services, <www.conti-engineering.com>, retrieved on May 28, 2014 (2 pages).

The Associated Press, "Proposal for Noisier Electric Cars at Low Speed", The New York Times, dated Jan. 7, 2013 (2 pages).

Mohammad Hazzaz Mahmud, Rana Saha & Sayemul Islam, "Smart walking stick—an electronic apporach to assist visually disabled persons", International Journal of Scientific & Engineering Research, vol. 4, Issue 10, dated Oct. 2013 (pp. 111-114).

Ray Massey, "Silent but deadly: EU rules all electric cars must make artificial engine noise", Mail Online, dated Apr. 2, 2014 (25 pages).

G. Gayathuri, M. Vishnupriya, R. Nandhini & MS. M. Banupriya, "Smart Walking Stick for Visually Impaired", International Journal of Scientific & Engineering Research, vol. 3, Issue 3, dated Mar. 2014 (pp. 4057-4061).

Delphi, "Delphi Vehicle Sound Generator", <www.delphi.com>, retrieved on May 28, 2014 (1 page).

International Searching Authority, "International Search Report", issued in connection with International Patent Application No. PCT/US2014/068199, dated Mar. 31, 2015 (3 pages).

Nternational Searching Authority, "Written Opinion", issued in connection with International Patent Application No. PCT/US2014/068199, dated Mar. 31, 2015 (9 pages).

International Searching Authority, "International Preliminary Report on Patentability", issued in connection with International Patent Application No. PCT/US2014/068199 on Jan. 17, 2017 (10 pages).

* cited by examiner

EMBEDDING INFORMATION IN GENERATED ACOUSTIC SIGNALS

FIELD OF THE DISCLOSURE

This disclosure relates generally to generating acoustic signals and, more particularly, to embedding information in generated acoustic signals.

BACKGROUND

Modern electric vehicles, such as electric automobiles, generally operate much more quietly than internal combustion engine vehicles, especially when being operated at lower vehicle speeds. Although this can be beneficial in, for example, reducing urban noise pollution, the quiet nature of electric vehicles can also cause pedestrians, cyclists, etc., in or near roadways to be unaware of the presence of these electric vehicles. As a result, pedestrians, cyclists and others may be at risk of being involved in accidents with electric vehicles due to their low noise footprints. Accordingly, government regulations requiring electric vehicles to emit at least a minimum level of sound have been, and continue to be, adopted. Vehicle manufacturers and third parties are developing and offering audio systems that generate acoustic signals to be emitted from electric vehicles to meet these regulations and consumer demands.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
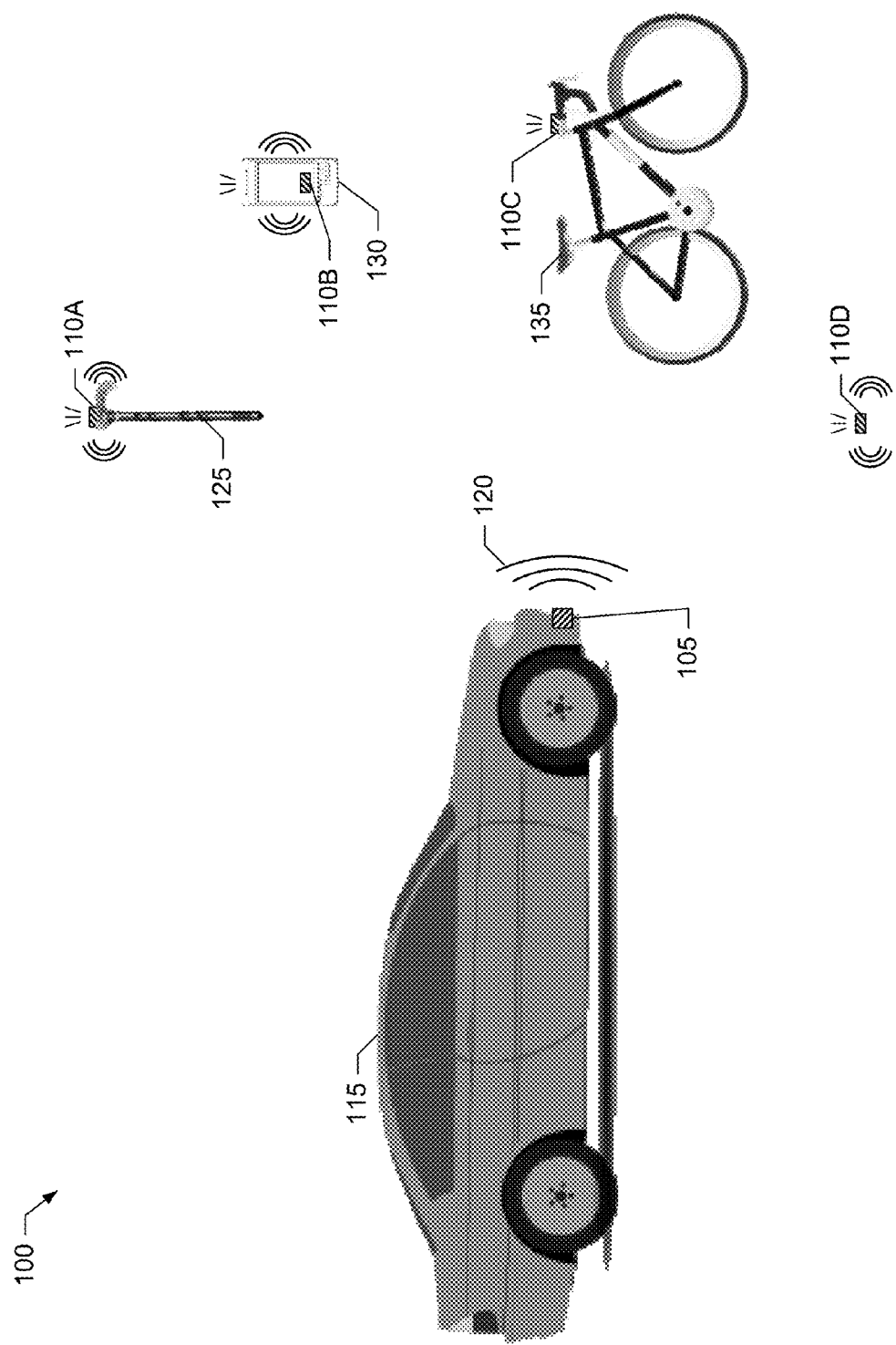
FIG. 1 is a block diagram of an example environment of use for an example watermarked acoustic signal generator and one or more example watermarked acoustic signal detectors disclosed herein.

Methods, apparatus, systems and articles of manufacture (e.g., physical storage media) to embed information in generated acoustic signals are disclosed herein. Some example methods disclosed herein are directed to embedding information in an acoustic signal output from an electric vehicle. Such example methods include obtaining a first audio signal to be used to generate the acoustic signal. Such example methods also include combining a second signal with the first audio signal, the second signal to convey first digital information that, when detected, indicates a presence of the electric vehicle. Such example methods further include providing the first audio signal with the second signal to an audio circuit that is to output the acoustic signal from the electric vehicle.

In some disclosed example methods, the second signal further conveys second digital information identifying the electric vehicle. Additionally or alternatively, in some disclosed example methods, the second signal further conveys third digital information comprising telemetry data associated with the electric vehicle. For example, the telemetry data can be provided by a sensor monitoring an operating condition of the electric vehicle. In some such examples, the telemetry data includes at least one of engine diagnostic data, tire pressure data, emissions system data, fuel level data, battery level data, vehicle speed data or vehicle interior audio level data.

In some disclosed example methods, the second signal additionally or alternatively conveys digital information associated with one or more occupants of the electric vehicle. For example, such digital information can indicate a number of occupants of the electric vehicle. Additionally or alternatively, in some examples, such digital information can indicate whether a first occupant of the electric vehicle is using a vehicle restraint (e.g., is wearing a seat belt).

Some example methods disclosed herein are directed to processing an acoustic signal output from an electric vehicle. Such example methods include processing a first audio signal obtained from an acoustic sensor, which is to receive the acoustic signal output from the electric vehicle, to determine whether a second signal is included in the first audio signal. Such example methods also include, when the second signal is determined to be included in the first audio signal, detecting first digital information conveyed by the second signal. Such example methods further include, when the first digital information is detected, generating an indication signal to indicate that the electric vehicle is nearby.

In some disclosed examples, generating the indication signal comprises at least one of activating a visual alert indicator, activating an audible alert indicator, activating a vibrating alert indicator.

Some disclosed example methods additionally or alternatively include, when the second signal is determined to be included in the first audio signal, decoding second digital information conveyed by the second signal, the second digital information identifying the electric vehicle. Some such disclosed example methods also include, when the second signal is determined to be included in the first audio signal, decoding third digital information conveyed by the second signal, the third digital information comprising telemetry data associated with the electric vehicle. For example, the telemetry data can be provided by a sensor monitoring an operating condition of the electric vehicle. In some such examples, the telemetry data includes at least one of engine diagnostic data, tire pressure data, emissions system data, fuel level data, battery level data, vehicle speed data or vehicle interior audio level data.

Some disclosed example methods additionally or alternatively include, when the second signal is determined to be included in the first audio signal, decoding digital information conveyed by the second signal and associated with one or more occupants of the electric vehicle. For example, such digital information can indicate a number of occupants of the electric vehicle. Additionally or alternatively, in some examples, such digital information can indicate whether a first occupant of the electric vehicle is using a vehicle restraint (e.g., is wearing a seat belt).

Some disclosed example methods additionally or alternatively include, when the second signal is determined to be included in the first audio signal: (1) processing the second signal at a first time and at a later second time to determine a Doppler shift associated with the acoustic signal output from the electric vehicle, and (2) determining a speed of the vehicle from the Doppler shift.

In some disclosed examples, the acoustic sensor mentioned above is included in or mounted on a walking stick, a bicycle handlebar, a mobile phone, etc.

These and other example methods, apparatus, systems and articles of manufacture (e.g., physical storage media) to embed information in generated acoustic signals are disclosed in further detail below.

As mentioned above, modern electric vehicles have little engine noise and, thus, typically run very quietly at lower vehicle speeds (e.g., under 25 mph.) Due to the risk of people being unaware of electric vehicles operating nearby, vehicle manufacturers and third parties are developing and offering audio systems that generate acoustic signals to be emitted from electric vehicles to meet governmental regulations and consumer demands. However, prior acoustic signal emission systems are generally limited to generating acoustic signals intended only to be heard by humans (or animals, such as guide dogs and/or other service animals). For example, such prior acoustic signal emission systems may generate one kind of acoustic signal (e.g., to mimic conventional engine noise), or even several different kinds of acoustic signal (e.g., to mimic different kinds of conventional engine noise, to include one or more different kinds of warning tones, etc.), but such acoustic signals are intended to be processed by a human (or animal) to be understood.

Unlike such prior systems, example acoustic signal emission techniques disclosed herein embed a second signal in the generated acoustic signal to be emitted from the electric vehicle. This second signal is constructed to be detectable by an electronic device and, when detected, indicates the presence of the electric vehicle. For example, the second signal embedded in the acoustic signal output from the electric vehicle can be detected and processed by an electronic device included in, mounted on, or implemented by, for example, a walking stick, a bicycle handlebar, a mobile phone, etc., to alert a user of the presence of the electric vehicle, thereby adding a further layer of warning that does not rely on the user being able to hear the generated acoustic signal. In some examples, this second signal further conveys a wealth of information concerning the electric vehicle and/or occupants of the electric vehicle. Additionally or alternatively, in some examples, the second signal embedded in the generated acoustic signal can be processed to determine a Doppler shift associated with the second signal, which can be used to estimate the speed of the electric vehicle.

Turning to the figures, a block diagram of an example environment of use 100 for an example watermarked acoustic signal generator 105 and one or more example watermarked acoustic signal detectors 110A-D implemented as disclosed herein is illustrated in FIG. 1. In the illustrated example of FIG. 1, the watermarked acoustic signal generator 105 is included in an example electric vehicle 115 to generate and emit an example acoustic signal 120 that is audible to people and/or animals in the vicinity of the electric vehicle 115. For example, the generated acoustic signal 120 may be designed to provide an audible indication to nearby people and/or animals (e.g., such as service animals) that the electric vehicle 115 is present, approaching, etc. Additionally or alternatively, in some examples, the acoustic signal 120 may be designed to provide audible feedback (e.g., which mimics the audio characteristics of a vehicle having an internal combustion engine) to a driver and/or occupants of the electric vehicle 115. As such, the example watermarked acoustic signal generator 105 of FIG. 1 may generate one kind of acoustic signal (e.g., to mimic conventional engine noise, a warning tone, etc.), or several different kinds of acoustic signals (e.g., to mimic different kinds of conventional engine noise, to emit different kinds of warning tones under different circumstances, etc.).

Additionally, the watermarked acoustic signal generator 105 of the illustrated example embeds of otherwise includes one or more information bearing signals, such as one or more watermark signals, in the generated acoustic signal(s) 120 being emitted. Watermark signals, also referred to herein as watermarks, are used in the context of media monitoring to enable additional information to be conveyed with the media. For example, audio watermarks can be embedded or otherwise included in the audio data/signal portion of a media stream, file and/or signal to convey data, such as media identification information, copyright protection information, etc., with the media. Such watermarks enable monitoring of the distribution and/or use of media, such as by detecting watermarks present in television broadcasts, radio broadcasts, streamed multimedia content, etc., to identify the particular media being presented to viewers, listeners, users, etc. Such information can be valuable to advertisers, content providers, and the like. Watermarks are typically extracted using a decoding operation.

In some examples, the watermarked acoustic signal generator 105 of FIG. 1 embeds an example watermark signal in the example generated acoustic signal 120 that, when detected by a corresponding watermark detector, indicates a presence of the electric vehicle 115 or, more generally, an emitter of an acoustic signal embedded with the watermark signal. In some examples, detection by a corresponding watermark detector of a valid watermark having the characteristics expected of a watermark emitted by the example watermarked acoustic signal generator 105, without further decoding of the information carried by the watermark, is sufficient to indicate the presence of an acoustic signal emitter (e.g., some electric vehicle), in general, without identifying the specific acoustic signal emitter (e.g., the specific electric vehicle 115). In such examples, the mere presence of the watermark conveys digital information indicating the general presence (e.g., if the valid watermark is detected) or absence (e.g., if the valid watermark is not detected) of an acoustic signal emitter (e.g., the vehicle 115). For example, detection of a watermark having valid error correction/detection bits, having expected frequency-domain characteristics, having expected time-domain characteristics, etc., for watermarks expected to generated by the example watermarked acoustic signal generator 105 may be sufficient to indicate the general presence in the vicinity of some acoustic signal emitter.

In some examples, the watermarked acoustic signal generator 105 further encodes the watermark signal to be embedded in the example generated acoustic signal 120 with additional digital information capable of being decoded and processed by a corresponding watermark decoder. For example, and as disclosed in further detail below, the watermarked acoustic signal generator 105 may encode the watermark signal to convey digital information identifying the specific acoustic signal emitter, such as the specific electric vehicle 115 emitting the generated acoustic signal 120.

Figure 2:
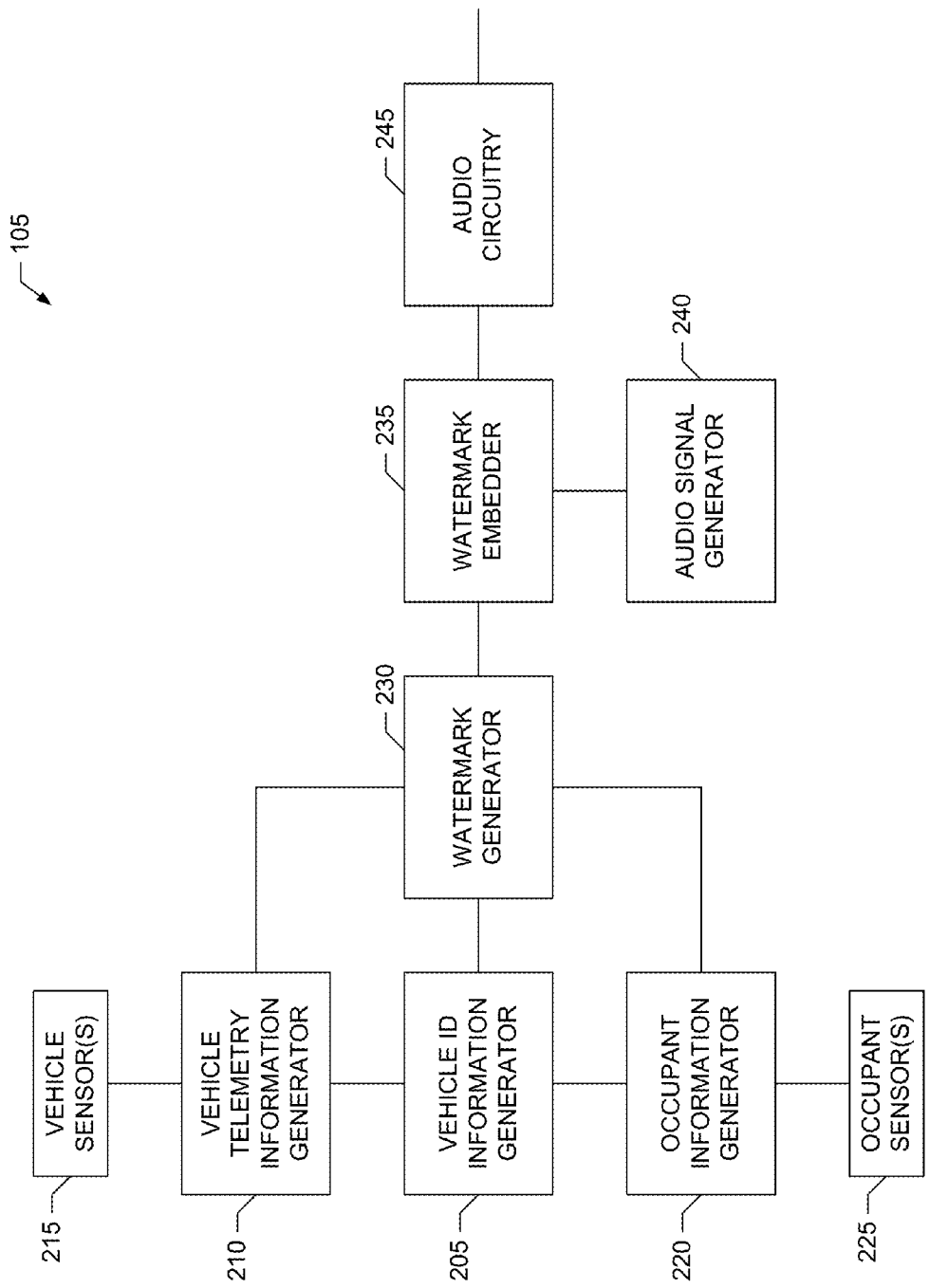
FIG. 2 is a block diagram illustrating an example implementation of the example watermarked acoustic signal generator of FIG. 1.

Additionally or alternatively, in some examples, the watermarked acoustic signal generator 105 may encode the watermark signal to convey digital information descriptive of characteristics of the specific electric vehicle 115 emitting the generated acoustic signal 120 (e.g., such as telemetry data describing operating characteristics of the electric vehicle 115), and/or digital information descriptive of the occupants/users of the electric vehicle 115 emitting the generated acoustic signal 120 (e.g., such as data describing the number and/or position(s) of the occupants, whether the occupants are using vehicle safety restraints, etc.), etc. An example implementation of the watermarked acoustic signal generator 105 is illustrated in FIG. 2 and described in further detail below.

The example environment of use 100 illustrated in FIG. 1 includes one or more example watermarked acoustic signal detectors 110A-D to detect and decode watermark signal(s) embedded or otherwise included in acoustic signal(s) emitted from acoustic signal emitters, such as the example generated acoustic signal 120 emitted from the example electric vehicle 115. For example, in the environment of use 100 illustrated in FIG. 1, a first example watermarked acoustic signal detector 110A is mounted on or otherwise included/integrated with an example walking stick 125 (which may be any type of walking stick, cane, etc.), a second example watermarked acoustic signal detector 110B is downloaded to, implemented by or otherwise included/integrated with an example mobile phone 130 (which may be any type of mobile phone, smartphone, etc.), a third example watermarked acoustic signal detector 110C is mounted on or otherwise included/integrated with an example bicycle 135 (e.g., such as on/with the bicycle handlebars), and a fourth example watermarked acoustic signal detector 110D is provided as a stand-alone device (which, in some examples, may be coupled/connected to any other device, apparatus, instrumentality, etc.). In the illustrated example of FIG. 1, the watermarked acoustic signal detectors 110A-D include one or more acoustic sensors to sense the generated acoustic signal(s) 120 emitted from one or more emitters, such as the example electric vehicle 115. The watermarked acoustic signal detectors 110A-D of the illustrated example also include/implement watermark decoding capabilities to detect (and decode, if appropriate) watermark signal(s) embedded in the sensed acoustic signal(s) 120.

The example watermarked acoustic signal detectors 110A-D further include one or more indicators, such as one or more visual alert indicator(s), audible alert indicator (s), vibrating alert indicator(s), etc., capable of being activated/enabled when valid watermark signal(s) are detected in the sensed acoustic signal(s) 120, and/or when valid information is decoded from the detected watermark signal(s). For example, the first example watermarked acoustic signal detector 110A mounted on or otherwise included/integrated with the example walking stick 125 includes a vibrating alert indicator (e.g., a mechanical vibrator) and a visual alert indicator (e.g., a lamp, light emitting diode (LED), etc.) that may be independently or collectively activated/enabled to indicate that a valid watermark has been detected (and/or certain information has been decoded from the watermark). The second example watermarked acoustic signal detector 110B implemented by or otherwise included/integrated with the example mobile phone 130 utilizes one or more of the display, speaker(s) and/or vibrating mechanism(s) of the mobile phone 130 as a visual alert indicator, an audible alert indicator, and/or a vibrating alert indicator that may be independently or collectively activated/enabled to indicate that a valid watermark has been detected (and/or certain information has been decoded from the watermark). The third example watermarked acoustic signal detector 110C mounted on or otherwise included/integrated with the example bicycle 135 includes a visual alert indicator (e.g., a lamp, light emitting diode (LED), etc.) that may be activated/enabled to indicate that a valid watermark has been detected (and/or certain information has been decoded from the watermark). The fourth example watermarked acoustic signal detector 110D includes one or more visual alert indicator(s) (e.g., lamps, LEDs, etc.), audible alert indicator (s) (e.g., speaker(s), transducer(s), etc.), vibrating alert indicator(s) (e.g., a mechanical vibrator) that may be independently or collectively activated/enabled to indicate that a valid watermark has been detected (and/or certain information has been decoded from the watermark).

In some examples, one or more of the watermarked acoustic signal detectors 110A-D employ a proximity test to determine whether to trigger one or more of the alert indicators. For example, the watermarked acoustic signal detectors 110A-D may measure the signal strength of a detected watermark and infer the proximity of the associated source (e.g., the electric vehicle 115) from the measured signal strength. In some such examples, the watermarked acoustic signal detectors 110A-D may wait to trigger one of more of the alert indicators until the measured signal strength of a detected watermark meets (e.g., equal or exceed) a signal strength threshold.

Figure 3:
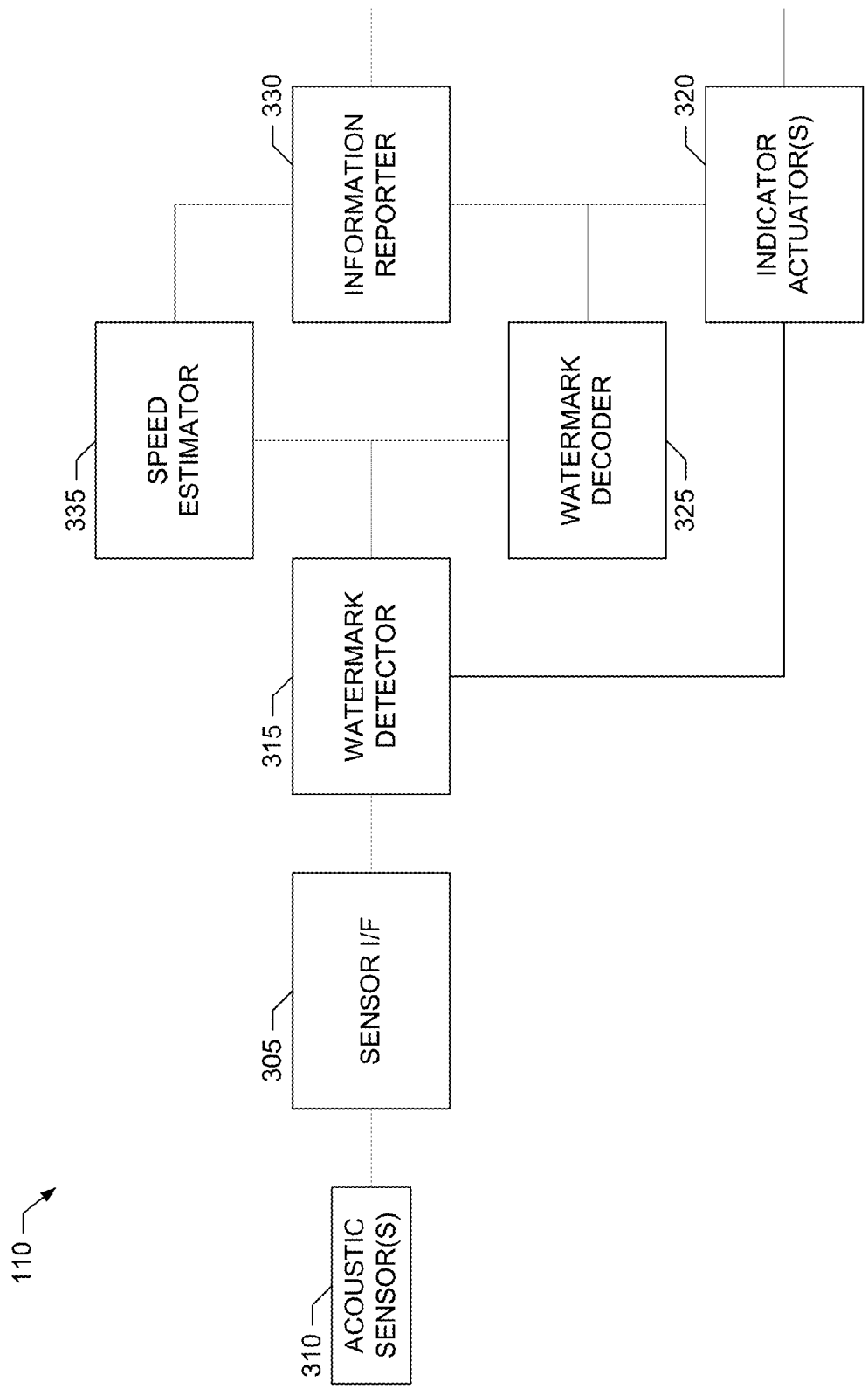
FIG. 3 is a block diagram illustrating an example implementation of one or more of the example watermarked acoustic signal detectors of FIG. 1

In some examples, one or more of the example watermarked acoustic signal detectors 110A-D decode digital information conveyed by the watermark signal(s) detected in the sensed acoustic signal(s) 120, and report the decoded digital information for subsequent use, processing, etc. For example, the watermarked acoustic signal detectors 110A, C and/or D may include (1) displays capable of presenting digital information decoded from a watermark signal visually to a user, (2) speech processing technology and speakers capable of presenting the digital information decoded from the watermark signal audibly to the user, etc. As another example, the watermarked acoustic signal detector 110B may utilize the display of the mobile phone 130 to present digital information decoded from a watermark signal visually to a user, and/or may use the speakers and audio circuitry of the mobile phone 130 to present the digital information decoded from the watermark signal audibly to the user, etc. In some examples, one or more of the example watermarked acoustic signal detectors 110A-D include one or more digital interfaces (e.g., such as one or more wireless/cellular data network interfaces, an Ethernet interface, a USB interface, etc.) to report digital information decoded from a watermark signal to a receiving device (e.g., such as a display device, a data collection facility, a computer, etc.). An example watermarked acoustic signal detector 110 that may be used to implement one or more of the example acoustic signal detectors 110A-D is illustrated in FIG. 3 and described in further detail below.

The example environment of use 100 of FIG. 1 is depicted as including one example watermarked acoustic signal generator 105 and four example watermarked acoustic signal detectors 110A-D, but embedding information in generated acoustic signals as disclosed herein is not limited thereto. For example, the example environment of use 100 can include any number(s) and/or combination(s) of watermarked acoustic signal generator(s) 105 and watermarked acoustic signal detectors 110A-D.

In the illustrated example of FIG. 1, the example watermarked acoustic signal generator 105 is depicted as being included in an electric vehicle 115 that is an automobile. However, use of the example watermarked acoustic signal generator 105 is not limited thereto. For example, the example watermarked acoustic signal generator 105 can be included in an any type of electric vehicle 115, such as an electric automobile/car, an electric golf cart, a motorcycle or bicycle powered by an electric motor, an unmanned aerial vehicle (UAV), etc. Similarly, use of the example watermarked acoustic signal detectors 110A-D is not limited to use with the example user devices/apparatus/instrumentalities depicted in the example of FIG. 1. Instead, in some examples, the example watermarked acoustic signal detectors 110A-D can be used alone or with any type(s) and/or number or devices, apparatus, instrumentalities, etc. Moreover, in some examples, the electric vehicle 115 may include a watermarked acoustic signal detector, such as one of the watermarked acoustic signal detectors 110A-D, to detect watermarked acoustic signal(s) emitted from other sources.

Also, the example watermarked acoustic signal generator 105 of FIG. 1 is not limited to use with electric vehicles, such as the electric vehicle 115. Instead, the example watermarked acoustic signal generator 105 can be used to identify the presence of almost any type of item, to indicate a particular geographic location, to demarcate an area of interest (e.g., such as en event venue, etc.). For example, the watermarked acoustic signal generator 105 of FIG. 1 could be used to emit watermarked acoustic signal(s) near restrooms, bus stops, elevators, restaurants, etc., to indicate/identify those locations of interest. Additionally or alternatively, the watermarked acoustic signal generator 105 could be placed in/near dangerous areas (e.g., construction zones, cliff edges, roadway intersections, etc.) to emit watermarked acoustic signal(s) capable of providing warning information to example watermarked acoustic signal detectors 110A-D operating in those areas.

Furthermore, in some examples, the watermarked acoustic signal generator 105 outputs its watermark signal(s) without embedding the watermark signals(s) in another audio signal. In such examples, the acoustic signal 120 output by the watermarked acoustic signal generator 105 may correspond to just the watermark signal(s). In some examples, the watermarked acoustic signal generator 105 may be configured to output the acoustic signal 120 such that the emitted watermark signal(s) are audible. In some examples, the acoustic signal generator 105 may be configured to output the acoustic signal 120 such that the emitted watermark signal(s) are inaudible (e.g., at a low value and/or outside the audible frequency range, etc.)

A block diagram of an example implementation of the watermarked acoustic signal generator 105 of FIG. 1 is illustrated in FIG. 2. The example watermarked acoustic signal generator 105 of FIG. 2 includes an example vehicle identification (ID) information generator 205 to generate digital information identifying an electric vehicle, such as the example electric vehicle 115, for which the watermarked acoustic signal generator 105 is to generate one or more watermarked acoustic signals, such as the example acoustic signal 120. For example, the digital information generated by the vehicle ID information generator 205 may include the vehicle identification number (VIN) assigned to the electric vehicle 115 and/or one or more other identifiers capable of identifying a manufacturer of the vehicle, a make of the vehicle, a model year of the vehicle, an owner/operator of the vehicle, etc. In some examples, such as in scenarios in which the electric vehicle 115 is operated by an organization maintaining a fleet of such vehicles, the information generated by the vehicle ID information generator 205 may be unique to, specified by or otherwise assigned by that organization. In the illustrated example of FIG. 2, the vehicle ID information generator 205 formats the digital information identifying the electric vehicle 115 in any appropriate digital data format, such as a binary data format, an American Standard Code for Information Interchange (ASCII) data format, etc., capable of being conveyed by a watermark to be embedded in the acoustic signal 120.

In some examples, the watermarked acoustic signal generator 105 of FIG. 2 additionally or alternatively includes an example vehicle telemetry information generator 210 to generate digital information including telemetry data for an electric vehicle, such as the example electric vehicle 115, for which the watermarked acoustic signal generator 105 is to generate one or more watermarked acoustic signals, such as the example acoustic signal 120. In the illustrated example of FIG. 2, the telemetry data included in the digital information generated by the example vehicle telemetry information generator 210 is derived or otherwise obtained from one or more example vehicle sensors 215 included in and/or in communication with the watermarked acoustic signal generator 105. For example, the vehicle sensor(s) 215 may include one or more fuel level sensor(s), tire pressure sensor(s), battery voltage level sensor(s), emission system monitoring sensor(s), engine diagnostic sensor(s), vehicle speed sensor(s), vehicle audio level sensor(s) (e.g., to measure the audio level inside the vehicle due to the acoustic sources, such as the vehicle radio/stereo system, passengers talking, etc.), etc. As such, the telemetry data included in the digital information generated by the example vehicle telemetry information generator 210 may include one or more of engine diagnostic data, tire pressure data, emissions system data, fuel level data, battery level data, vehicle speed data, vehicle interior audio level data, etc. In the illustrated example of FIG. 2, the vehicle telemetry information generator 210 formats the digital information including the telemetry data in any appropriate digital data format, such as a binary data format, an ASCII data format, etc., capable of being conveyed by a watermark to be embedded in the acoustic signal 120.

In some examples, the watermarked acoustic signal generator 105 of FIG. 2 additionally or alternatively includes an example occupant information generator 220 to generate digital information associated with the occupant(s) of an electric vehicle, such as the example electric vehicle 115, for which the watermarked acoustic signal generator 105 is to generate one or more watermarked acoustic signals, such as the example acoustic signal 120. In the illustrated example of FIG. 2, the occupant data included in the digital information generated by the example occupant information generator 220 is derived or otherwise obtained from one or more example occupant sensors 225 included in and/or in communication with the watermarked acoustic signal generator 105. For example, the occupant sensor(s) 225 may include one or more location sensor(s), vehicle restraint sensor(s), etc. In some examples, location sensor(s) included in the occupant sensor(s) 225 may be positioned in the seat(s) of the electric vehicle 115. In such examples, the digital information generated by the example occupant information generator 220 may indicate whether a particular seat (or, more generally, location) of the electric vehicle is occupied, thereby permitting determination of the number and/or location(s) of the vehicle occupant(s). In some such examples, the digital information generated by the example occupant information generator 220 may expressly indicate the number and/or location(s) of the vehicle occupant(s).

Additionally or alternatively, in some examples, vehicle restraint sensor(s) included in the occupant sensor(s) 225 may be positioned in the vehicle restraint(s) (e.g., seat belt(s), infant seats, booster seats, etc.) of the electric vehicle 115 and may indicate whether respective ones of the vehicle restraint(s) are in use. In such examples, the occupant location data obtained from the location sensor(s) included in the occupant sensor(s) 225 can be combined with the vehicle restraint data obtained by the vehicle restraint sensor(s) included in the occupant sensor(s) 225 such that the digital information generated by the example vehicle telemetry information generator 210 includes data indicating which occupant(s) of the vehicle is/are wearing seat belts, using child/booster seats, etc. In the illustrated example of FIG. 2, the occupant information generator 220 formats the digital information associated with the vehicle occupants in any appropriate digital data format, such as a binary data format, an ASCII data format, etc., capable of being conveyed by a watermark to be embedded in the acoustic signal 120.

The example watermarked acoustic signal generator 105 of FIG. 2 also includes an example watermark generator 230 to generate a watermark signal to convey the digital information generated by one or more of the example vehicle ID information generator 205, the example vehicle telemetry information generator 210 and/or the example occupant information generator 220. For example, the watermark generator 230 may concatenate or otherwise combine the digital information obtained from one or more of the example vehicle ID information generator 205, the example vehicle telemetry information generator 210 and/or the example occupant information generator 220 to yield a digital data sequence to be conveyed by the generated watermark signal. In some examples, the watermark generator 230 generates different (e.g., distinct) watermark signals for the respective digital information received from different ones of the example vehicle ID information generator 205, the example vehicle telemetry information generator 210 and/or the example occupant information generator 220.

In some examples, the watermark generator 230 generates the watermark signal to be a frequency domain watermark capable of conveying this digital information in frequency domain components of the generated acoustic signal 120. Example watermark generation techniques that can be implemented by the watermark generator 230 to generate such frequency domain watermarks include, but are not limited to, the examples disclosed in U.S. Pat. No. 8,359, 205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, and U.S. Publication No. 2010/0223062, entitled "Methods and Apparatus to Perform Audio Watermarking and Watermark Detection and Extraction," which was published on Sep. 2, 2010, all of which are hereby incorporated by reference in their respective entireties. U.S. Pat. Nos. 8,359,205, 8,369,972 and U.S. Publication No. 2010/0223062 describe example watermarking systems in which a watermark is embedded in an audio signal by manipulating a set of frequencies of the audio signal.

In some examples, the watermark generator 230 generates the watermark signal to be a time domain watermark capable of conveying digital information in time domain components of the generated acoustic signal 120. In such examples, the watermark generator 230 may generate a watermark signal that is to modulate the amplitude and/or phase of an audio signal in the time domain. Example watermark generation techniques that can be implemented by the watermark generator 230 to generate such time domain watermarks include, but are not limited to, generating a spread spectrum time domain signal modulated by the input digital information, which is to then be embedded in (e.g., added to) the audio signal used to generate the acoustic signal 120.

The example watermarked acoustic signal generator 105 of FIG. 2 further includes an example watermark embedder 235 to embed the watermark signal(s) generated by watermark generator 230 in an audio signal obtained from an example audio signal generator 240. In the illustrated example of FIG. 2, the audio signal generator 240 generates an audio signal that is to be applied to example audio circuitry 245 to generate and emit the acoustic signal 120. As such, the example audio signal generator 240 can be implemented by any existing and/or novel audio signal generation technology capable of generating audio signals that yield an appropriate acoustic signal 120 (e.g., such as one that meets one or more governmental regulations, design specifications, etc.). Similarly, the example audio circuitry 245 can be implemented by any existing and/or novel audio circuit technology capable of receiving an audio signal and emitting an appropriate acoustic signal 120 (e.g., such as one that meets one or more governmental regulations, design specifications, etc.).

In some examples, the watermark embedder 235 employs psychoacoustic masking to embed the watermark signal(s) in the audible frequency range of the audio signal obtained from the audio signal generator 240, but such that the watermark signal(s) is/are inaudible (or substantially inaudible) in the acoustic signal 120. In some examples, the watermark embedder 235 embeds the watermark signal(s) in the audio signal obtained from the audio signal generator 240 such that the watermark signal(s) is/are embedded in one or more frequency bands of the audio signal that are outside the range of human (and/or animal) hearing. However, in some examples, the watermark embedder 235 does not employ psychoacoustic masking and embeds the watermark signal(s) in the audio signal obtained from the audio signal generator 240 such that the watermark signal(s) are audible. For example, the watermark embedder 235 can implement such watermark embedding by performing one or more signal addition, signal scaling and/or signal frequency shift operations on the watermark signal obtained from the watermark embedder 235 and the audio signal obtained from the audio signal generator 240. Other example watermark embedding techniques, which may be implemented by the example watermark embedder 235, are described in U.S. Pat. Nos. 8,359,205, 8,369,972 and U.S. Publication No. 2010/0223062, which are discussed in further detail above. As noted above, the watermark embedder 235 provides the resulting watermarked audio signal (which corresponds to the audio signal obtained from the audio signal generator 240 and embedded with the watermark signal obtained from the watermark embedder 235) to the example audio circuitry 245, which uses the watermarked audio signal to generate and emit the corresponding acoustic signal 120.

While an example manner of implementing the example watermarked acoustic signal generator 105 of FIG. 1 is illustrated in FIG. 2, one or more of the elements, processes and/or devices illustrated in FIG. 2 may be combined, divided, re-arranged, omitted, eliminated and/or implemented in any other way. Further, the example vehicle ID information generator 205, the example vehicle telemetry information generator 210, the example vehicle sensor(s)

215, the example occupant information generator 220, the example occupant sensor(s) 225, the example watermark generator 230, the example watermark embedder 235, the example audio signal generator 240, the example audio circuitry 245 and/or, more generally, the example watermarked acoustic signal generator 105 of FIG. 2 may be implemented by hardware, software, firmware and/or any combination of hardware, software and/or firmware. Thus, for example, any of the example vehicle ID information generator 205, the example vehicle telemetry information generator 210, the example vehicle sensor(s) 215, the example occupant information generator 220, the example occupant sensor(s) 225, the example watermark generator 230, the example watermark embedder 235, the example audio signal generator 240, the example audio circuitry 245 and/or, more generally, the example watermarked acoustic signal generator 105 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example watermarked acoustic signal generator 105, the example vehicle ID information generator 205, the example vehicle telemetry information generator 210, the example vehicle sensor(s) 215, the example occupant information generator 220, the example occupant sensor(s) 225, the example watermark generator 230, the example watermark embedder 235, the example audio signal generator 240 and/or the example audio circuitry 245 is/are hereby expressly defined to include a tangible computer readable storage device or storage disk such as a memory, a digital versatile disk (DVD), a compact disk (CD), a Blu-ray disk, etc. storing the software and/or firmware. Further still, the example watermarked acoustic signal generator 105 may include one or more elements, processes and/or devices in addition to, or instead of, those illustrated in FIG. 2, and/or may include more than one of any or all of the illustrated elements, processes and devices.

A block diagram of an example watermarked acoustic signal detector 110 that may be used to implement one or more of the example acoustic signal detectors 110A-D of FIG. 1 is illustrated in FIG. 3. The example watermarked acoustic signal detector 110 of FIG. 3 includes an example sensor interface 305 to obtain audio data from one or more example acoustic sensors 310 included in and/or in communication with the watermarked acoustic signal detector 110. In the illustrated example, the acoustic sensor(s) 310 may include one or more microphones, audio transducers, etc., capable of sensing generated acoustic signals, such as the example acoustic signal 120. The sensor interface 305 of the illustrated example includes any appropriate sensor interface technology (e.g., such as an audio gain control stage, an analog-to-digital conversion stage, etc.) to process the output(s) of the acoustic sensor(s) 310 to determine audio data, which may be representative of the sensed acoustic signal 120.

The example watermarked acoustic signal detector 110 of FIG. 3 also includes an example watermark detector 315 to detect a watermark signal embedded in the audio data obtained from the sensor interface 305. In some examples, the watermark signal is embedded in the frequency domain of the audio data. In such examples, the watermark detector 315 employs frequency domain processing to detect whether a valid watermark is embedded in the frequency domain of the audio data obtained from the sensor interface 305. Example watermark detection techniques that can be implemented by the watermark detector 315 to detect watermarks embedded in the frequency domain of audio data include, but are not limited to, examples disclosed in U.S. Pat. Nos. 8,359,205, 8,369,972 and U.S. Publication No. 2010/0223062, which are described in further detail above. In some examples, the watermark signal is embedded in the time domain of the audio data. In such examples, the watermark detector 315 employs time domain processing, such as amplitude demodulation, phase demodulation, spread spectrum detection, etc., to detect whether a valid watermark is embedded in the time domain of the audio data obtained from the sensor interface 305.

As disclosed above, in some examples, the mere presence of the watermark conveys digital information indicating the general presence (e.g., if the valid watermark is detected) or absence (e.g., if the valid watermark is not detected) of an acoustic signal emitter, such as the example electric vehicle 115. Thus, in such examples, if a valid watermark is detected by the example watermark detector 315, then the watermark detector 315 asserts one or more example indicator actuator(s) 320, which causes the indicator actuator(s) 320 to activate/assert one or more indicators to indicate that some electric vehicle (or, more generally, some watermarked acoustic signal emitter) is present. For example, the indicator actuator(s) 320 included in the example watermarked acoustic signal detector 110 of FIG. 3 may include, but are not limited to, actuators/drivers to control one or more visual alert indicator(s), audible alert indicator (s), vibrating alert indicator(s), etc., as described above. In some examples, the watermark detector 315 determines that a valid watermark signal is present by determining that the error correction/detection bits of the detected watermark are valid, by determining that the frequency domain and/or time domain characteristics of the detected watermark signal match expected characteristics, etc.

In some examples, the example watermarked acoustic signal detector 110 of FIG. 3 includes an example watermark decoder 325 to decode a valid watermark signal detected by the example watermark decoder 315. The example watermark decoder 325 implements any appropriate existing and/or novel digital data decoding technology to decode an input watermark signal to obtain the digital information conveyed by the watermark. For example, the watermark decoder 325 decodes the watermark signal to obtain vehicle ID information (e.g., as generated by the example vehicle ID information generator 205), vehicle telemetry information (e.g., as generated by the example vehicle telemetry information generator 210), vehicle occupant information (e.g., as generated by the example occupant information generator 220), etc., or combinations of such information conveyed by the detected watermark signal.

In some examples, the watermark decoder 325 provides some or all of the digital information decoded from the watermark signal to the example indicator actuator(s) 320 to enable indicator(s) (e.g., visual alert indicator(s), audible alert indicator (s), vibrating alert indicator(s), etc.) associated with the digital information to be actuated/activated as appropriate. For example, one or more indicators may be associated with specific vehicle IDs and, thus, may be actuated/activated based on the vehicle ID information conveyed by the watermark signal. Additionally or alternatively, one or more indicators (e.g., such as one or more tire pressure, fuel level, battery level, speed level, vehicle interior audio level, emissions system and/or engine diagnostic warning indicators) may be associated with vehicle telemetry data and, thus, may be actuated/activated based on the vehicle ID information conveyed by the watermark signal. Additionally or alternatively, one or more indicators (e.g., such as one or more vehicle restraint usage and/or vehicle occupancy indicators) may be associated with occupant data and, thus, may be actuated/activated based on the vehicle occupant information conveyed by the watermark signal.

In some examples, the watermarked acoustic signal detector 110 of FIG. 3 further includes an example information reporter 330 to report, to a receiving device and/or to a local storage device, the digital information decoded by the example watermark decoder 325 from the watermark signal detected by the example watermark detector 315. For example, the information reporter 330 can implement any wireless (e.g., WiFi, cellular data, etc.) and/or wired (e.g., USB, Ethernet, etc.) digital data interface capable of sending the decoded digital information to a receiving device, such as a display device, a data collection server, a personal computer, a smartphone, etc. (e.g., to permit reported vehicle telemetry data and/or occupant data to be used by vehicle maintenance personnel, law enforcement, etc.) In some examples, the information reporter 330 stores the digital information decoded by the example watermark decoder 325 in a local storage device to enable the digital information to be retrieved and analyzed at a later time (e.g., to permit stored vehicle telemetry data and/or occupant data to be analyzed during an accident investigation, etc.).

In some examples, the watermarked acoustic signal detector 110 of FIG. 3 also includes an example speed estimator 335 to estimate the speed of the electric vehicle 115 from a watermark signal embedded in the acoustic signal 120 emitted from the electric vehicle 115. In the illustrated example of FIG. 2, the example speed estimator 335 estimates the speed of the electric vehicle 115 by using the watermark signal detected by the watermark detector 315 to estimate a Doppler shift associated with the acoustic signal 120 emitted from the electric vehicle 115. The example speed estimator 335 then converts the estimated Doppler shift to an estimated speed of the electric vehicle 115 using the relationship between the Doppler shift and the relative speed between the source of an acoustic signal and an observer of the acoustic signal. In some examples, such as when the watermark signal embedded in the acoustic signal 120 includes one or more frequency components, the example speed estimator 335 determines the frequency (or frequencies) of the detected watermark signal at a first time and at a later second time to determine the Doppler shift associated with watermark signal and, thus, associated with the acoustic signal 120 output from the electric vehicle 115.

While an example manner of implementing one or more of the example watermarked acoustic signal detectors 110A-D of FIG. 1 is illustrated by the example watermarked acoustic signal detector 110 illustrated in FIG. 3, one or more of the elements, processes and/or devices illustrated in FIG. 3 may be combined, divided, re-arranged, omitted, eliminated and/or implemented in any other way. Further, the example sensor interface 305, the example acoustic sensor(s) 310, the example watermark detector 315, the example indicator actuator(s) 320, the example watermark decoder 325, the example information reporter 330, the example speed estimator 335 and/or, more generally, the example watermarked acoustic signal detector 110 of FIG. 3 may be implemented by hardware, software, firmware and/or any combination of hardware, software and/or firmware. Thus, for example, any of the example sensor interface 305, the example acoustic sensor(s) 310, the example watermark detector 315, the example indicator actuator(s) 320, the example watermark decoder 325, the example information reporter 330, the example speed estimator 335 and/or, more generally, the example watermarked acoustic signal detector 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example watermarked acoustic signal detector 110, the example sensor interface 305, the example acoustic sensor(s) 310, the example watermark detector 315, the example indicator actuator(s) 320, the example watermark decoder 325, the example information reporter 330 and/or the example speed estimator 335 is/are hereby expressly defined to include a tangible computer readable storage device or storage disk such as a memory, a digital versatile disk (DVD), a compact disk (CD), a Blu-ray disk, etc. storing the software and/or firmware. Further still, the example watermarked acoustic signal detectors 110 and/or 110A-D may include one or more elements, processes and/or devices in addition to, or instead of, those illustrated in FIG. 3, and/or may include more than one of any or all of the illustrated elements, processes and devices.

Figure 4:
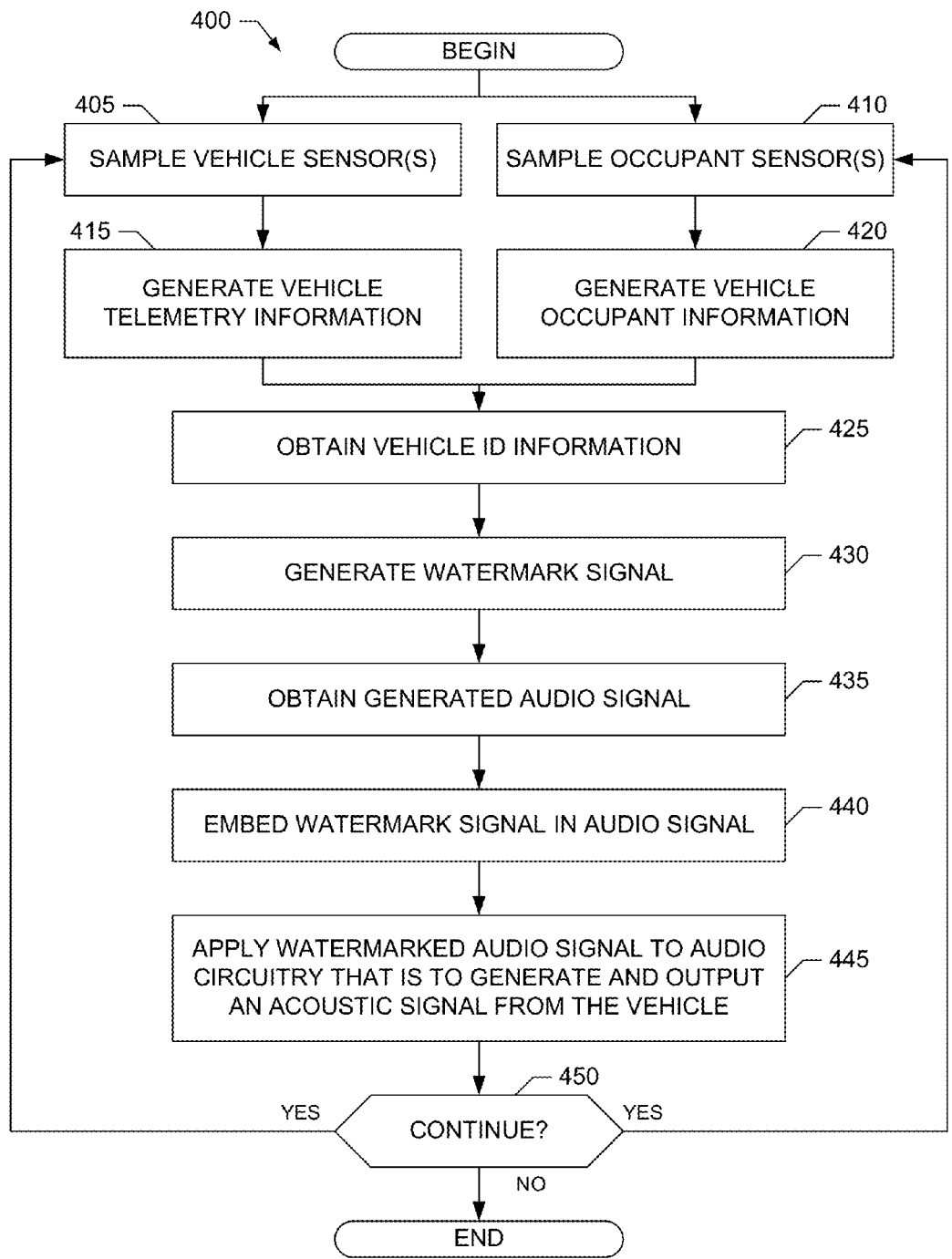
FIG. 4 is a flowchart representative of example machine readable instructions that may be executed to implement the example watermarked acoustic signal generator of FIGS. 1 and/or 2.
Figure 5:
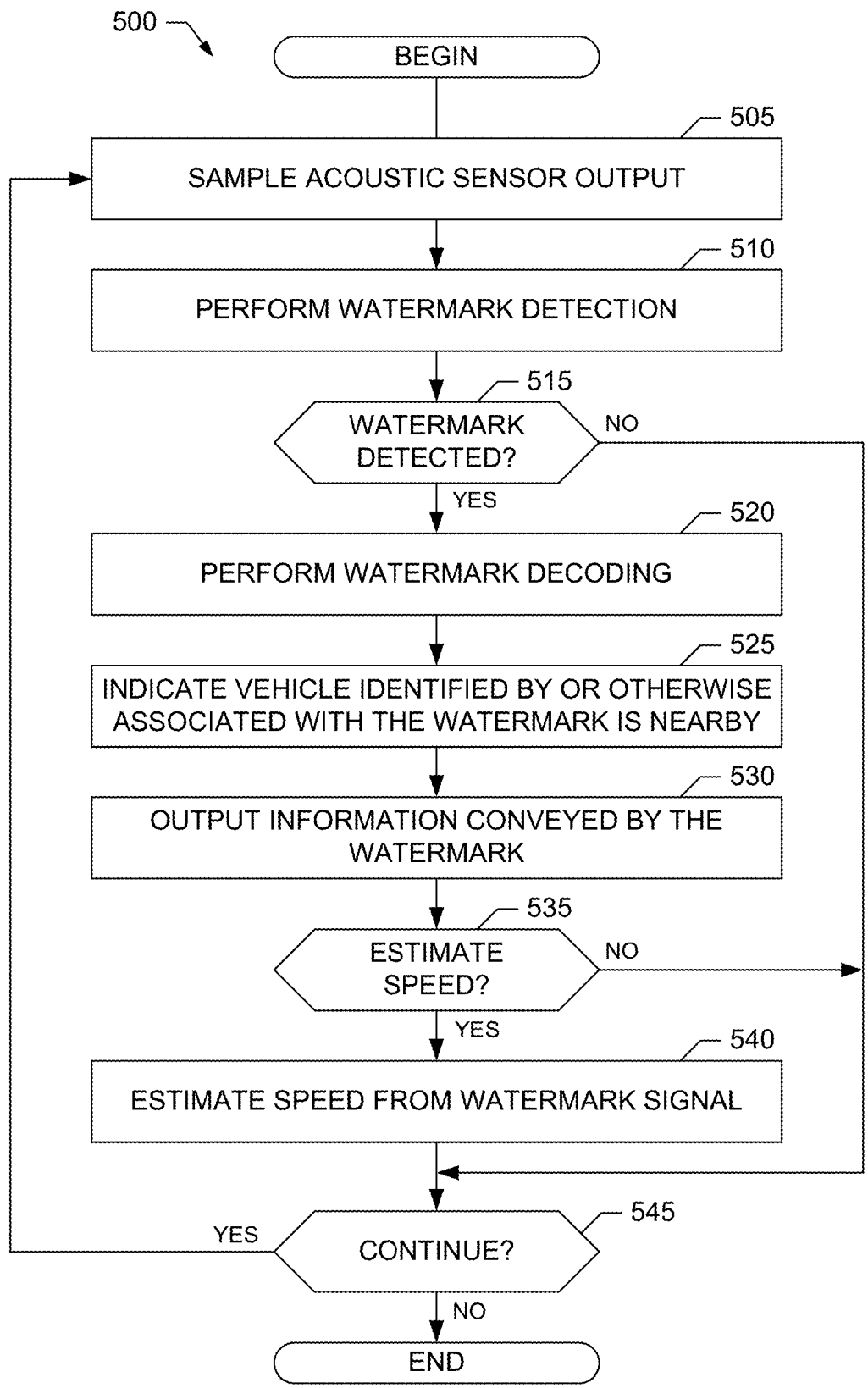
FIG. 5 is a flowchart representative of example machine readable instructions that may be executed to implement one or more of the example watermarked acoustic signal detectors of FIGS. 1 and/or 3.

Flowcharts representative of example machine readable instructions for implementing the example watermarked acoustic signal generator 105, the example watermarked acoustic signal detector(s) 110 and/or 110A-D, the example vehicle ID information generator 205, the example vehicle telemetry information generator 210, the example vehicle sensor(s) 215, the example occupant information generator 220, the example occupant sensor(s) 225, the example watermark generator 230, the example watermark embedder 235, the example audio signal generator 240, the example audio circuitry 245, the example sensor interface 305, the example acoustic sensor(s) 310, the example watermark detector 315, the example indicator actuator(s) 320, the example watermark decoder 325, the example information reporter 330 and/or the example speed estimator 335 are shown in FIGS. 4 and 5. In these examples, the machine readable instructions comprise one or more programs for execution by a processor, such as the processor 612 shown in the example processor platform 600 discussed below in connection with FIG. 6. The one or more programs, or portion(s) thereof, may be embodied in software stored on a tangible computer readable storage medium such as a CD-ROM, a floppy disk, a hard drive, a digital versatile disk (DVD), a Blu-ray disk™, or a memory associated with the processor 612, but the entire program or programs and/or portions thereof could alternatively be executed by a device other than the processor 612 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 4 and 5, many other methods of implementing the example watermarked acoustic signal generator 105, the example watermarked acoustic signal detector(s) 110 and/or 110A-D, the example vehicle ID information generator 205, the example vehicle telemetry information generator 210, the example vehicle sensor(s) 215, the example occupant information generator 220, the example occupant sensor(s) 225, the example watermark generator 230, the example watermark embedder 235, the example audio signal generator 240, the example audio circuitry 245, the example sensor interface 305, the example acoustic sensor(s) 310, the example watermark detector 315, the example indicator actuator(s) 320, the example watermark decoder 325, the example information reporter 330 and/or the example speed estimator 335 may alternatively be used. For example, with reference to the flowcharts illustrated in FIGS. 4 and 5, the order of execution of the blocks may be changed, and/or some of the blocks described may be changed, eliminated, combined and/or subdivided into multiple blocks.

As mentioned above, the example processes of FIGS. 4 and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4 and 5 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

An example program 400 that may be executed to implement the example watermarked acoustic signal generator 105 of FIGS. 1 and/or 2 is represented by the flowchart shown in FIG. 4. The example program 400 may be executed at predetermined intervals, based on an occurrence of a predetermined event, etc., or any combination thereof. With reference to the preceding figures and associated written descriptions, the example program 400 of FIG. 4 begins execution at blocks 405 and 410 at which the watermarked acoustic signal generator 105 executes parallel processing threads to obtain vehicle and occupant information to be conveyed by a watermark embedded in a generated acoustic signal, such as the example acoustic signal 120 emitted from the example electric vehicle 115. For example, in a first processing thread beginning at block 405, the example vehicle telemetry information generator 210 of the watermarked acoustic signal generator 105 samples sensor data obtained from one or more of the example vehicle sensor(s) 215, as described above. At block 415, the vehicle telemetry information generator 210 generates digital information including vehicle telemetry data determined from the sensor data obtained at block 405, as described above. In a second processing thread beginning at block 410, the example occupant information generator 220 of the watermarked acoustic signal generator 105 samples sensor data obtained from one or more of the example occupant sensor(s) 225, as described above. At block 420, the occupant information generator 220 generates digital information including occupant data determined from the sensor data obtained at block 410, as described above.

At block 425, the example vehicle ID information generator 205 of the watermarked acoustic signal generator 105 generates or otherwise obtains digital information identifying the electric vehicle 115 (or, more generally, the device, apparatus, instrumentality, etc., for which the watermarked acoustic signal generator 105 is to generate an acoustic signal), as described above. At block 430, the example watermark generator 230 of the watermarked acoustic signal generator 105 generates a watermark signal to convey the digital information obtained at blocks 415, 420 and/or 425, as described above. At block 435, a generated audio signal is obtained from the example audio signal generator 240, as described above. At block 440, the example watermark embedder 235 of the watermarked acoustic signal generator 105 embeds, as described above, the watermark signal obtained at block 430 in the audio signal obtained at block 435. At block 445, the watermark embedder 235 provides the resulting watermarked audio signal to the example audio circuitry 245, which, as described above, is to generate and emit the acoustic signal 120 from the electric vehicle 115 (or, more generally, from the device, apparatus, instrumentality, etc., for which the watermarked acoustic signal generator 105 is to generate an acoustic signal).

At block 450, the watermarked acoustic signal generator 105 determines whether generation of a watermarked acoustic signal is to continue. If acoustic signal generation is to continue (block 450), then processing returns to the blocks 405 and 410. Otherwise, execution of the example program 400 ends.

An example program 500 that may be executed to implement one or more of the example watermarked acoustic signal detectors 110 and/or 110A-D of FIGS. 1 and/or 3 is represented by the flowchart shown in FIG. 5. For convenience and without loss of generality, execution of the example program 500 is described in the context of the example watermarked acoustic signal detector 110 operating in the example environment of use 100. The example program 500 may be executed at predetermined intervals, based on an occurrence of a predetermined event, etc., or any combination thereof. With reference to the preceding figures and associated written descriptions, the example program 500 of FIG. 5 begins execution at block 505 at which the example sensor interface 305 of the watermarked acoustic signal detector 110 samples audio data obtained from one or more of the example acoustic sensor(s) 310, as described above. At block 510, the example watermark detector 315 of the watermarked acoustic signal detector 110 performs watermark detection, as described above, on the audio data obtained at block 505.

If a watermark is detected in the audio data (block 515), at block 520 the example watermark decoder 325 of the watermarked acoustic signal detector 110 decodes the digital information conveyed by the watermark, as described above. At block 525, the example indicator actuator(s) 320 of the watermarked acoustic signal detector 110 actuate/activate one or more indicators (e.g., visual alert indicator(s), audible alert indicator (s), vibrating alert indicator(s), etc.), as described above, to indicate that the electric vehicle 115 (or, more generally, the device, apparatus, instrumentality, etc., emitting the detected watermark) is nearby. Additionally or alternatively, at block 525 the indicator actuator(s) 320 may activate one or more indicators based on the digital information decoded from the watermark, as described above. At block 530, the example information reporter 330 of the watermarked acoustic signal detector 110 reports the digital information decoded at block 520 from the watermark to a receiving device, as described above.

At block 535, the watermarked acoustic signal detector 110 determines whether the detected watermark is to be used to estimate a speed of the electric vehicle 115 (or, more generally, the device, apparatus, instrumentality, etc., emitting the detected watermark). If speed is to be estimated (block 535), then at block 540 the example speed estimator 335 of the watermarked acoustic signal detector 110 processes the detected watermark, as described above, to estimate a Doppler shift associated with the watermark and further estimate a vehicle speed from the estimated Doppler shift.

At block 545, the watermarked acoustic signal detector 110 determines whether detection of watermarks in an acoustic signal is to continue. If watermark detection is to continue (block 545), then processing returns to the block 505. Otherwise, execution of the example program 500 ends.

Figure 6:
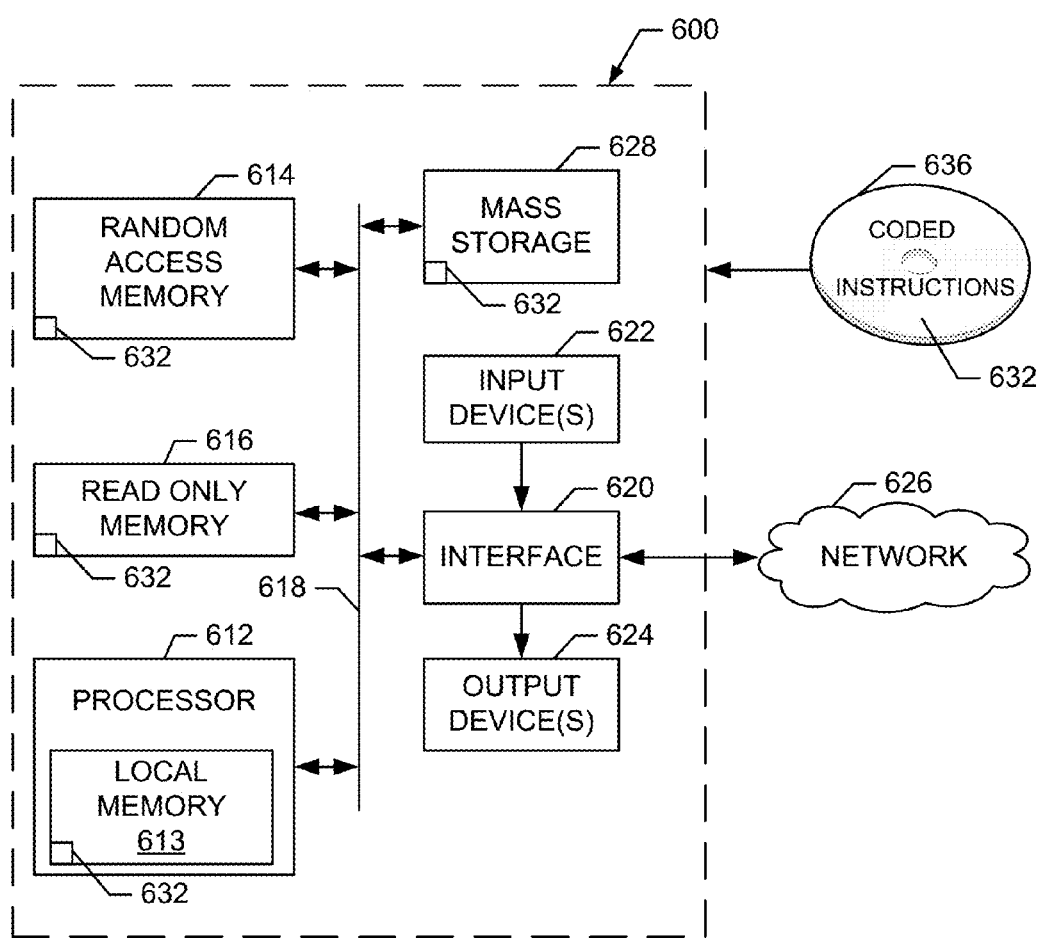
FIG. 6 is a block diagram of an example processor platform that may execute the example machine readable instructions of FIGS. 4 and/or 5 to implement the example watermarked acoustic signal generator of FIGS. 1 and/or 2, and/or one or more of the example watermarked acoustic signal detectors of FIGS. 1 and/or 3.

FIG. 6 is a block diagram of an example processor platform 600 capable of executing the instructions of FIGS. 4 and 5 to implement the example watermarked acoustic signal generator 105, the example watermarked acoustic signal detector(s) 110 and/or 110A-D, the example vehicle ID information generator 205, the example vehicle telemetry information generator 210, the example vehicle sensor(s) 215, the example occupant information generator 220, the example occupant sensor(s) 225, the example watermark generator 230, the example watermark embedder 235, the example audio signal generator 240, the example audio circuitry 245, the example sensor interface 305, the example acoustic sensor(s) 310, the example watermark detector 315, the example indicator actuator(s) 320, the example watermark decoder 325, the example information reporter 330 and/or the example speed estimator 335 of FIGS. 1-3. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a link 618. The link 618 may be implemented by a bus, one or more point-to-point connections, etc., or a combination thereof. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 600, can allow the user to control the computer system and provide data to the computer using physical gestures, such as, but not limited to, hand or body movements, facial expressions, and face recognition.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID (redundant array of independent disks) systems, and digital versatile disk (DVD) drives.

Coded instructions 632 corresponding to the instructions of FIGS. 4 and 5 may be stored in the mass storage device 628, in the volatile memory 614, in the non-volatile memory 616, in the local memory 613 and/or on a removable tangible computer readable storage medium, such as a CD or DVD 636.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to embed information in an acoustic signal output from an electric vehicle, the method comprising:
    obtaining a first audio signal to be used to generate the acoustic signal to be output from the electric vehicle;
    embedding, by executing an instruction with a processor, a second signal conveying first digital information including sensed vehicle speed data in the first audio signal; and
    providing the first audio signal embedded with the second signal to an audio circuit that is to output the acoustic signal from the electric vehicle.

2. The method as defined in claim 1, wherein the second signal further conveys second digital information identifying the electric vehicle.

3. The method as defined in claim 2, wherein the second signal further conveys third digital information including telemetry data associated with the electric vehicle.

4. The method as defined in claim 3, wherein the telemetry data is provided by a sensor monitoring an operating condition of the electric vehicle.

5. The method as defined in claim 3, wherein the telemetry data includes at least one of engine diagnostic data, tire pressure data, emissions system data, fuel level data, battery level data, or vehicle interior audio level data.

6. The method as defined in claim 1, wherein the second signal further conveys second digital information associated with one or more occupants of the electric vehicle.

7. The method as defined in claim 6, wherein the second digital information indicates a number of occupants of the electric vehicle.

8. The method as defined in claim 6, wherein the second digital information indicates whether a first occupant of the electric vehicle is wearing a seat belt.

9. A tangible machine readable storage medium comprising machine readable instructions which, when executed, cause a machine to at least:
obtain a first audio signal to be used to generate an acoustic signal to be output from an electric vehicle;
embed a second signal conveying first digital information including sensed vehicle speed data in the first audio signal; and
provide the first audio signal embedded with the second signal to an audio circuit that is to output the acoustic signal from the electric vehicle.

10. The storage medium as defined in claim 9, wherein the second signal further conveys second digital information identifying the electric vehicle.

11. The storage medium as defined in claim 10, wherein the second signal further conveys third digital information including telemetry data associated with the electric vehicle.

12. The storage medium as defined in claim 11, wherein the telemetry data is provided by a sensor monitoring an operating condition of the electric vehicle.

13. The storage medium as defined in claim 11, wherein the telemetry data includes at least one of engine diagnostic data, tire pressure data, emissions system data, fuel level data, battery level data, or vehicle interior audio level data.

14. The storage medium as defined in claim 9, wherein the second signal further conveys second digital information associated with one or more occupants of the electric vehicle.

15. The storage medium as defined in claim 14, wherein the second digital information indicates a number of occupants of the electric vehicle.

16. The storage medium as defined in claim 14, wherein the second digital information indicates whether a first occupant of the electric vehicle is wearing a seat belt.

17. An apparatus to embed information in an acoustic signal output from an electric vehicle, the apparatus comprising:
a watermark generator to generate a watermark signal conveying first digital information including vehicle interior audio level data representing an audio level measured inside the electric vehicle; and
a watermark embedder to:
obtain an audio signal to be used to generate the acoustic signal to be output from the electric vehicle;
embed the watermark signal in the audio signal to generate a watermarked audio signal; and
provide the watermarked audio signal to an audio circuit that is to output the acoustic signal from the electric vehicle.

18. The apparatus as defined in claim 17, wherein the watermark generator is further to generate the watermark signal to convey the first digital information and second digital information identifying the electric vehicle.

19. The apparatus as defined in claim 17, further including:
a sensor to sense an operating condition of the electric vehicle; and
an information generator to:
generate second digital information including telemetry data determined from sensor data obtained from the sensor; and
provide the second digital information to the watermark generator, the watermark generator to generate the watermark signal to convey the first digital information and the second digital information.

20. The apparatus as defined in claim 19, wherein the telemetry data includes at least one of engine diagnostic data, tire pressure data, emissions system data, fuel level data, battery level data, or vehicle speed data.

21. The apparatus as defined in claim 17, further including:
a sensor; and
an information generator to:
generate second digital information associated with one or more occupants of the electric vehicle, the second digital information being based on sensor data obtained from the sensor; and
provide the second digital information to the watermark generator, the watermark generator to generate the watermark signal to convey the first digital information and the second digital information.

22. The apparatus as defined in claim 21, wherein the second digital information indicates a number of occupants of the electric vehicle.

23. The apparatus as defined in claim 21, wherein the second digital information indicates whether a first occupant of the electric vehicle is wearing a seat belt.

* * * * *